April 12, 1955

C. W. LEGUILLON ET AL 2,705,999

TIRE TREAD SLITTING APPARATUS WITH
LATERALLY RECIPROCATING CUTTERS

Filed May 24, 1951

Inventors
Charles W. Leguillon
Edwin B. Katzenmeyer
By Harold S. Meyer
Atty

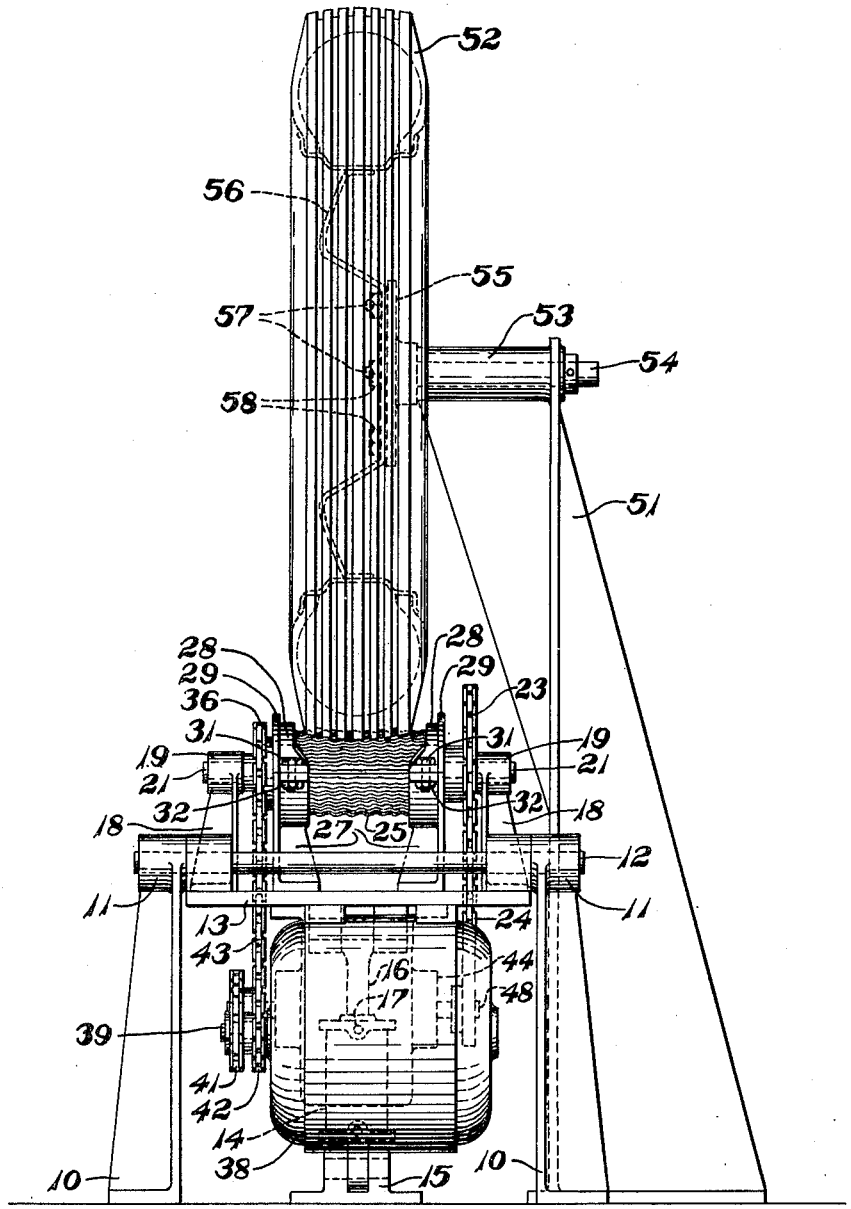

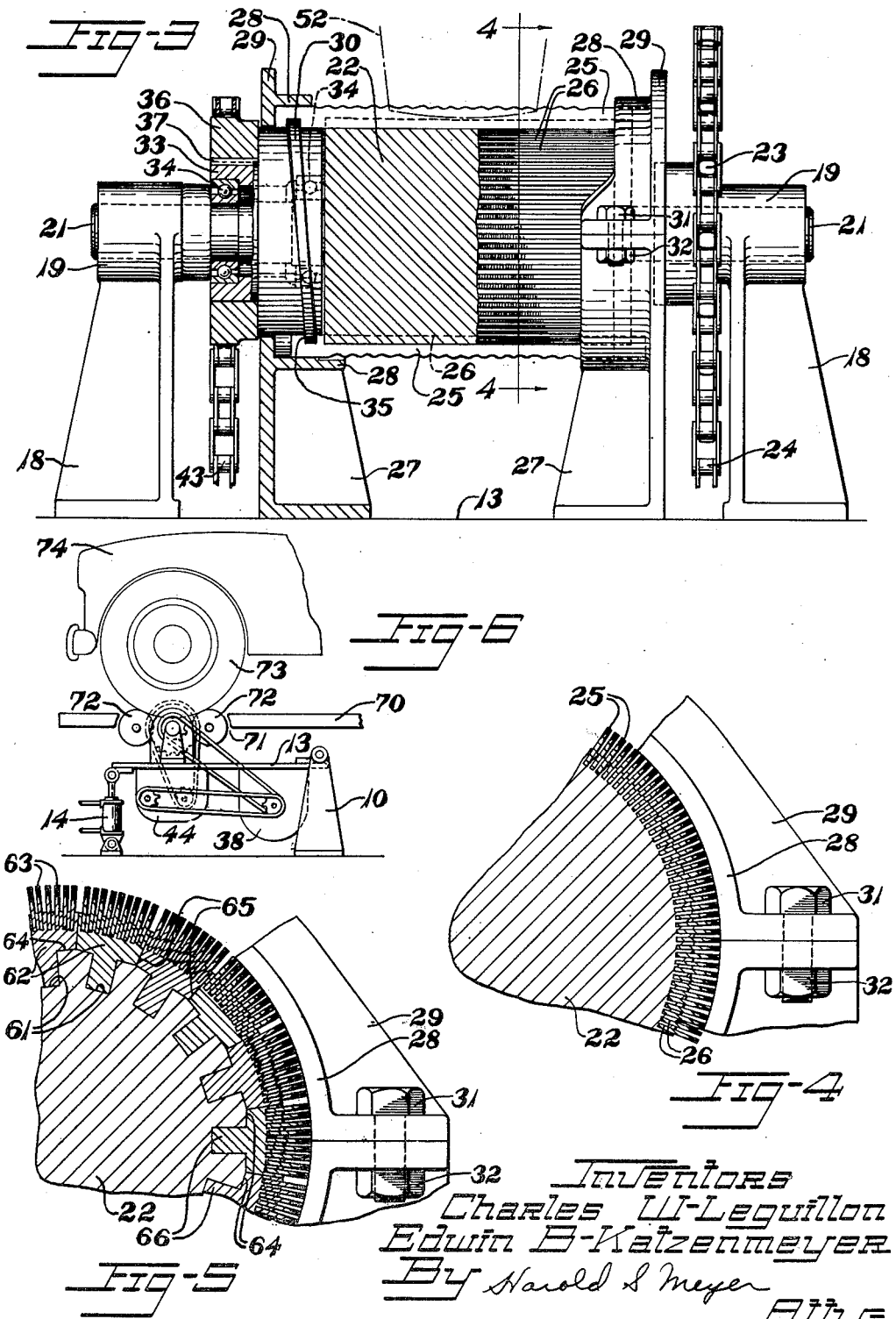

Inventors
Charles W. Leguillon
Edwin B. Katzenmeyer
By Harold S. Meyer
Atty.

United States Patent Office 2,705,999
Patented Apr. 12, 1955

2,705,999

TIRE TREAD SLITTING APPARATUS WITH LATERALLY RECIPROCATING CUTTERS

Charles W. Leguillon and Edwin B. Katzenmeyer, Akron, Ohio, assignors to The B. F. Goodrich Company, New York, N. Y., a corporation of New York Application May 24, 1951, Serial No. 228,094

8 Claims. (Cl. 164—10.2)

This invention relates to tire tread slitting apparatus and especially to apparatus for cutting transverse incisions in tire treads.

It has been found that slitting of the treads of tires at closely spaced intervals improves the wear-resistance and skid-resistance and increases the quietness of operation of the tires. Tire slitting apparatus used heretofore has been designed for slitting treads at relatively coarse spacing but the prior tire slitting apparatus, so far as we are aware, has not been suited for the rapid slitting of tire treads at the relatively fine spacing which we desire to obtain.

It is an object of this invention to provide improved apparatus for cutting incisions in tire treads and especially to provide apparatus that is adapted to cut the incisions rapidly and effectively.

Other and related objects are to provide for indexing of the incisions in the tread without stopping the turning movement of the tire, to effect indexing and turning of the tire tread by the engagement of the cutting blades, to provide high speed, short stroke reciprocating cutting action of the cutting blades with a minimum amount of inertia of moving parts, to provide for cutting incisions in the tread substantially without the removal of the tread material, to provide for cutting the tread without dismounting the tire from the wheel or from the vehicle, and to provide for convenience of operation.

These and other objects will be apparent from the following description, reference being had to the drawings in which:

Fig. 2 is an end view of the apparatus shown in Fig. 1.

Fig. 3 is an end view on an enlarged scale of the apparatus shown in Fig. 1, parts being sectioned and broken away, and some cutting blades being removed.

Fig. 4 is a sectional view taken along lines 4—4 of Fig. 3, parts being broken away.

Fig. 5 is a sectional view like Fig. 4, but showing a modified construction.

Fig. 6 is a view in elevation of a further modified construction.

Figure 1:
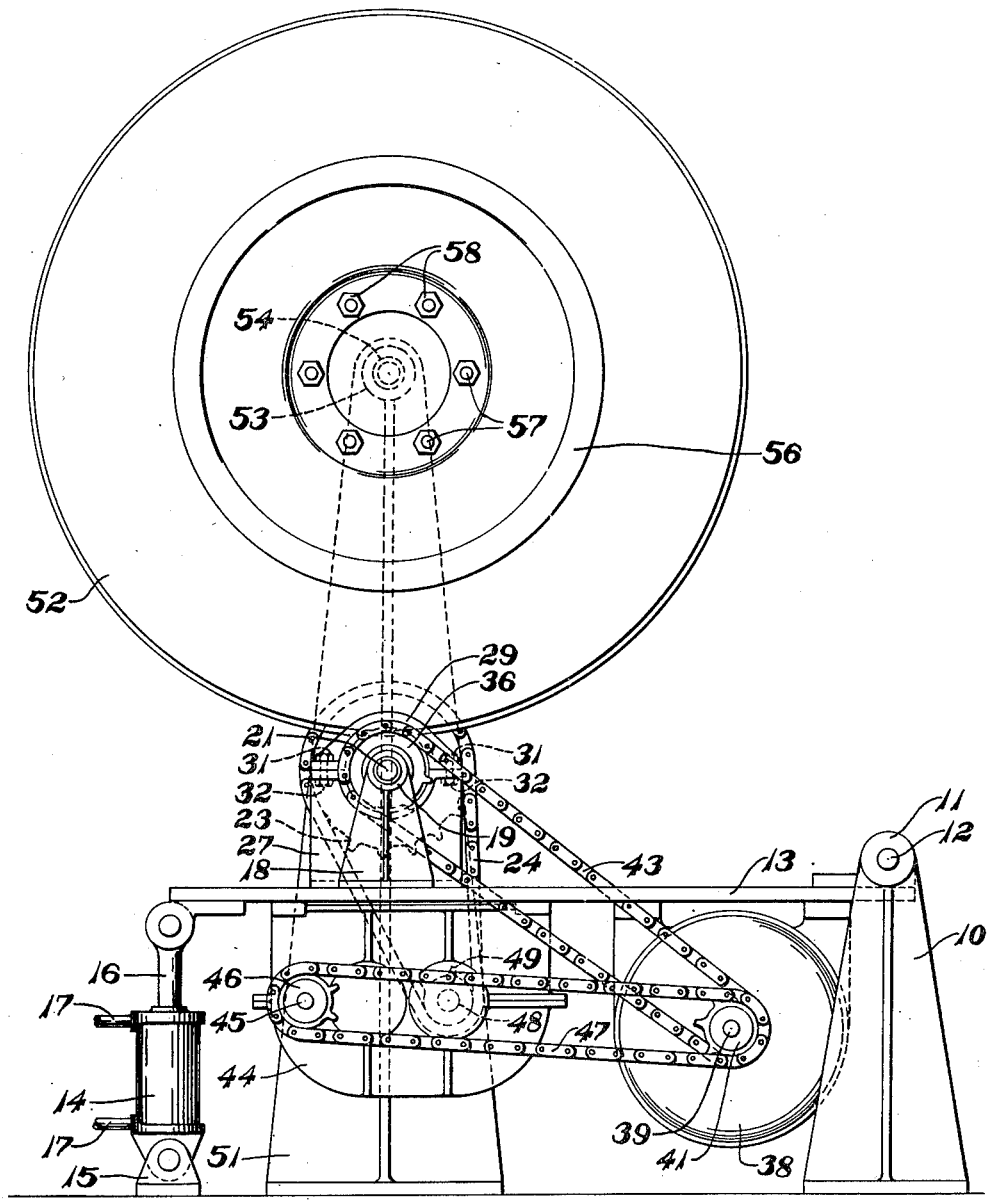
Fig. 1 is a view in side elevation of a tire slitting apparatus constructed in accordance with and embodying the invention, a tire being shown mounted thereon.

Referring to the drawings and especially to Figs. 1 and 2, a pair of supporting stanchions 10, 10 are shown which may be secured to a base plate or floor. The stanchions 10, 10 have journals 11, 11 for receiving a shaft 12. A beam 13 extends in a horizontal direction away from the stanchions 10, 10 and is mounted for swinging movement upwards and downwards around the pivot provided by the shaft 12. A suitable raising and lowering device for swinging the beam 13 is secured to the beam and in the present embodiment a hydraulic cylinder 14 is disposed between the beam and the base plate or floor. The cylinder 14 is pivotally mounted on a bracket 15 which is secured to the base plate or floor and the cylinder has a piston rod 16 which is pivotally mounted on the beam 13. Hydraulic fluid may be pumped into the cylinder 14 or removed from the cylinder through fluid conducting conduits 17, 17 to lift and lower the beam 13.

Supports 18, 18 are mounted on the beam 13 and journals 19, 19 are mounted on the supports 18, 18 for receiving a shaft 21 with an enlarged central drum portion 22. A sprocket 23 is mounted on the shaft 21 for turning the shaft and a shaft driving chain 24 is disposed around the sprocket in driving engagement therewith.

Referring to Figs. 3 and 4 where a more detailed showing is made of the tread cutting apparatus mounted on the supports 18, 18, a plurality of suitable light weight cutting elements such as blades 25, 25 which may be of hardened steel and have sharp, preferably undulated, edges are slideably mounted in transverse slots 26, 26 in the central drum portion 22 of the shaft 21 for high speed, short stroke reciprocation with a minimum of inertia of reciprocating parts. Brackets 27, 27 are mounted on the beam 13 at each end of the central drum portion 22 for embracing the blades 25, 25 and the brackets have cylindrical flanges 28, 28 which are disposed radially outward of the cutting blades and in abutting relation with the ends of the blades to hold them in the slots 26, 26 of the blade supporting central drum portion 22. Upper portions 29, 29 of the brackets 27, 27 are separable from the lower portions to facilitate replacement of the blades 25, 25 and are secured to the lower portions by bolts and nuts 31, 31 and 32, 32 respectively.

A collar 33 is mounted rotatively around the shaft 21 for high speed rotation on bearings 34, 34 to reciprocate the cutting blades 25, 25. At the outer surface of the collar 33 is a cylindrical cam with a cam surface in the form of a circumferential curved cam rib 30. The cutting blades 25, 25 have notches 35, 35 for receiving the curved cam rib 30 and upon rotation of the collar 33 the blades 25, 25 are reciprocated in the slots 26, 26 in short strokes. The drum portion 22 and other parts are not reciprocated by the movement of the cam rib 30 and there is a minimum amount of inertia of the moving parts. The distance the cutting blades 25, 25 reciprocate longitudinally is determined by the curvature of the cam rib 30 which is small as shown in the drawings to facilitate cutting of the tire tread. A sprocket 36 is mounted fixedly on the collar 33 as with a key 37 which is disposed in keyways in the sprocket and in the collar.

A suitable power source such as a motor 38 for turning the shaft 21 and the collar 33 is mounted on the beam 13 and has a driving shaft 39 which carries two driving sprockets 41 and 42. A chain 43 is disposed in direct driving engagement around motor sprocket 42 and the collar sprocket 36 for turning the collar 33 at high speeds.

In order to turn the shaft 21 at a relatively slow speed a speed reduction unit 44 is mounted on the beam 13 and has a high speed shaft 45 upon which is mounted a sprocket 46. The sprocket 46 is connected to the motor sprocket 41 by a chain 47 disposed in driving engagement around the sprockets 46 and 41. A low speed shaft 48 of the speed reduction unit 44 has a sprocket 49 which drives the sprocket 23 through the chain 24 and thereby turns the shaft 21 at a relatively slow speed.

It is desired that the cutting blades 25, 25 reciprocate at a high speed, as for instance over 1,000 cycles per minute to cut the incisions in the rubber tread quickly in a neat manner and without objectionable removal of tread material. To index the incisions and turn the tire the shaft 21 is rotated at a relatively slow speed which is related to the speed of the blades 25, 25. A variety of different speed ratios can be obtained through the use of different size sprockets 23, 36, 41, 42, 46 and 49 and by changing the speed ratio of the speed reduction unit 44.

A tire 52 which is to be operated on may be held on a stand 51 which may be a cast or welded assembly and is disposed adjacent the beam 13. The stand 51 is secured to the base plate or floor and overhangs the beam 13. A horizontally extending journal 53 in the stand 51 receives a stub shaft 54 which has a plate 55 to which a wheel 56 may be bolted. The plate 55 has studs 57, 57 which are disposed for engagement with apertures in the wheel 56 and nuts 58, 58 may be threaded on the studs 57, 57 for clamping the wheel against the plate.

In operation, the tire 52 in the mounted condition on the wheel 56 is mounted on the plate 55 on shaft 54 of the stand 51.

The motor 38 which is mounted for movement with the beam 13 rotates the shaft 21 at a relatively slow speed and rotates the collar 33 at a relatively fast speed. The rotation of the collar 33 turns the cam rib 30 which reciprocates the cutting blades 25, 25 at a high speed in the slots 26, 26 of the cylindrical central portion 22 of the shaft 21 for cutting the incisions in the tread rapidly and effectively. The beam 13 may then be raised for bringing the cutting blades into engagement with the tire tread by actuating the hydraulic cylinder 14. The depth of the incisions in the tire tread is controlled by regulating the distance the beam 13 is raised. The cutting blades 25, 25 extend substantially across the tire tread width plus an amount in excess of the width on each side sufficient to allow continuous engagement of the blades throughout the tread width during reciprocation of the blades. A suitable extent of cutting blades 25, 25 relative to the tire tread is shown in Fig. 2.

Upon engagement of the cutting blades 25, 25 with the tire treads the apparatus of the present invention has the advantage of indexing and rotating the tire 52 through the rotation of shaft 21 which rotates the cutting blades 25, 25 and thereby turns the tire 52. The self-indexing feature of the apparatus makes it possible to slit the tire tread while continuously turning the tire. The spacing of the cutting blades 25, 25 determines the spacing of the incisions of the tread and fine spacing on the order of 16 cuts per inch or more can be effectively produced. The speed at which the shaft 21 is turned is determined by the speed of the motor 38 and the ratio of speed reduction of the speed reduction unit 44 as well as the size of the sprockets 23, 36, 41, 42, 46 and 49.

After the tire 52 has been rotated the desired amount, ordinarily one revolution, the beam 13 may be lowered by means of the hydraulic cylinder 14 and piston 16. Then the tire 52 and wheel 56 are removed and may be mounted on the vehicle.

A modification useful especially where it is desired to mount the cutting blades very close together to obtain exceedingly fine spacing of the incisions is shown in Fig. 5 in which the cylindrical central portion 22 of the shaft 21 has slots 61, 61 extending radially inward and axially of the shaft for receiving cutting blade holders 62, 62. Each blade holder has a set of cutting blades 63, 63 secured in the holder for reciprocating the blades with the holder in groups. The blades 63, 63 may be very thin and may be mounted at very close intervals as the blade holders 62, 62 reinforce and strengthen the blades. The central portion 22 has facets 64, 64 at the outer surface upon which the holders slide and each of the holders 62, 62 have side faces 65, 65 for sliding engagement with the side faces of the adjoining holders.

Ribs 66, 66 of the holders 62, 62 are slideably mounted in slots 61, 61 of the central portion 22 and have notches (not shown) at the ends for receiving the curved cam rib 30. Upon rotation of the collar 33 at a high speed relative to the central portion 22, the holders 62, 62 with the groups of cutting blades 63, 63 reciprocate in short strokes in the slots 61, 61 of the central portion 22 at a high speed, preferably over 1000 cycles per minute for cutting the tread surface of the tire mounted in the apparatus. As in the first described embodiment the cutting blades 63, 63 are self-indexing and by rotating the shaft 21 the tire is rotated.

A further modification shown in Fig. 6 is especially adapted for cutting incisions in the tread while the tire and wheel are mounted on the vehicle. A vehicle supporting platform or ramp 70 is disposed over the beam 13 and over the shaft 21 and the central drum portion 22 which contains the cutting blades 25, 25. An opening 71 is provided in the ramp 70 over the shaft 21 in such a position that the cutting blades 25, 25 may be advanced into the opening 71 and retracted from the opening by raising and lowering the beam 13. Supporting rollers 72, 72 are mounted in the ramp 70 to support a tire 73 of a vehicle 74 for cutting engagement by the blades 25, 25 and for rotation relative to the ramp 70.

In operation the tire is moved to a position on the rollers 72, 72 by moving the vehicle 74 into position on the ramp 70. The motor 38 of the cutting apparatus is started and the beam 13 raised to bring the rapidly reciprocating blades 25, 25 into cutting engagement with the tire tread. The rotation of the shaft 21 rotates the blades 25, 25 which turn the tire 73 and index the incisions in the tire tread while the blades are in cutting engagement with the tread. The rollers 72, 72 permit the tire to turn relative to the ramp 70 without moving the vehicle. After the tire tread has been turned the desired amount the beam 13 is lowered removing the cutting blades 25, 25 from the tread. In this condition of the apparatus the vehicle 74 may be moved off the ramp 70 with the tire tread completely cut and without having necessitated the removal of the wheel or tire from the vehicle.

Figure 7:
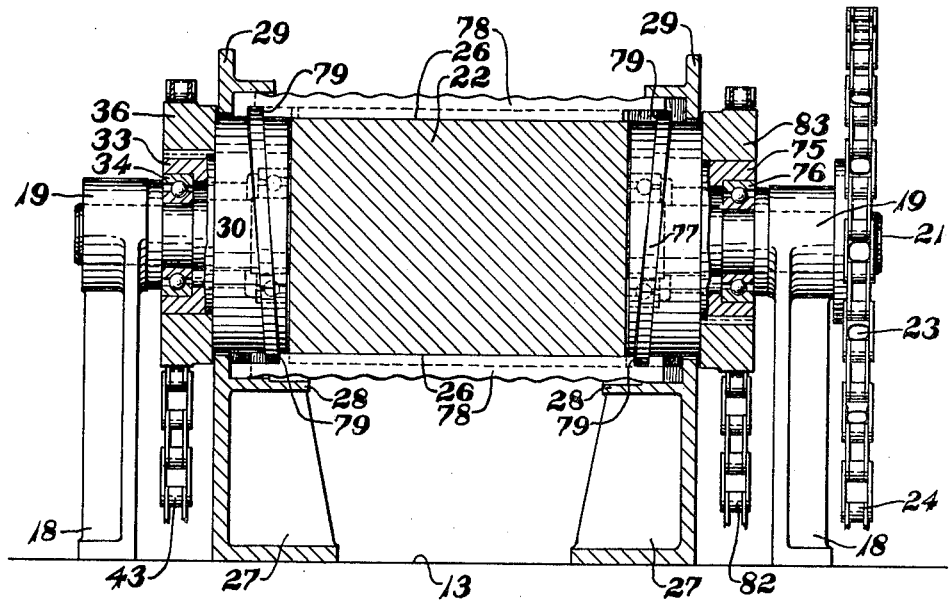
Fig. 7 is a view like Fig. 3 in section of a further modified construction.

A still further modification shown in Fig. 7 minimizes vibration by balancing the reciprocating movement of the cutting blades. In addition to the collar 33 mounted rotatively around the shaft 21 at one end of the central drum portion 22 a second collar 75 is mounted rotatively around the shaft at the other end on bearings 76. At the outer surface of the collar 75 is a cylindrical cam with a cam surface in the form of a cylindrical cam rib 77.

Cutting blades 78, 78 of this modification are mounted for reciprocation in the slots 26, 26 of the central drum portion 22 and have notches 79, 79 at one end for receiving the curved ribs 30 and 77 of the collars 33 and 75. One end of each of the cutting blades 78, 78 is recessed to provide clearance for the curved cam rib 30 or 77 which is not in engagement with the cutting blade.

As shown in Fig. 7 notches 79, 79 of alternate cutting blades 78, 78 are disposed at opposite ends of the central drum portion 22 and are in engagement with the cam ribs 30 and 77. The collars are disposed with the cams in opposition such that alternate cutting blades 78, 78 will be in the axially outermost position at the same time and in the axially innermost position at the same time and therefore the axial reciprocating movement of alternate blades is balanced.

The collar 75 may be rotated at the same speed as the collar 33 by a chain 82 which engages a sprocket 83 mounted on the collar 75.

In operation, the chains 43 and 82 may be in engagement with sprockets on a common shaft turned by a suitable power source such as the high speed motor 38 shown in Figs. 1 and 2 to rotate the collars 33 and 75 simultaneously at a high speed and reciprocate the cutting blades 78, 78 in short strokes at a high speed for cutting incisions in a tire. The cutting blades 78, 78 are reciprocated with alternate blades moving in opposite directions to minimize vibration by balancing the reciprocating movement of the cutting blades.

The shaft 21 may be turned to index and turn the tire by the chain 24 which is in engagement with the sprocket 23 and the driving sprocket 49 of a suitable power source such as the speed reduction unit 44 driven by the motor 38 as shown in Figs. 1 and 2.

Figure 8:
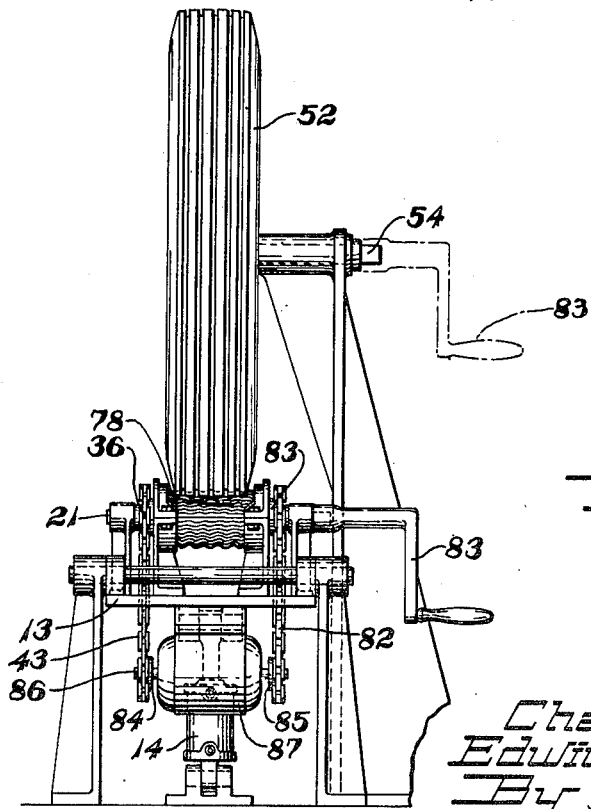
Fig. 8 is a view like Fig. 2 of a still further modified construction.

A further modification shown in Fig. 8 is useful especially where it is desirable to rotate the shaft 21 and tire 52 manually. The shaft 21 may have a crank 83 mounted on one end for rotating the shaft and thereby rotate the tire through the movement of the cutting blades 78, 78 which engage the tire.

The cutting blades 78, 78 are reciprocated in short strokes by the rotation of collars 33 and 75 which have curved cams 30 and 77 engaging the notches 79, 79 in the blades. The collars 33 and 75 are rotated by the chains 43 and 82 as shown in Fig. 7 which engage sprockets 84 and 85 mounted on a shaft 86 of a high speed motor 87 mounted on the beam 13.

In operation of the modification shown in Fig. 8, the cutting blades 78, 78 are reciprocated in short strokes at a high speed by activating the motor 87 and the cutting blades 78, 78 are brought into engagement with the tire tread by raising the beam 13 with the cylinder 14. The crank 83 is then turned by hand to rotate the shaft 21 and thereby rotates the tire 52 which is in engagement with the cutting blades 78, 78.

As the shaft 21 is turned by the manually cranked tire 52 the incisions are indexed and cut in the tire by the rapidly reciprocating blades 78, 78 and no other means for rotating the shaft is used. In the form shown in Fig. 8 shaft 54 is also formed to receive the crank 83 as indicated in broken lines on the drawing, in which case rotation of the crank causes the tire to turn the drum rather than the drum to turn the tire, the cutting action being the same with the crank or either shaft 21 or 54.

Variations may be made without departing from the scope of the invention as it is defined in the following claims.

We claim:

1. A tire tread slitting apparatus comprising a rotatable shaft, a drum structure on said shaft, a collar member disposed rotatably around said shaft in adjoining relation to said drum structure, cutting blades mounted on said drum structure in side by side relation around said drum structure for reciprocating movement relative to said drum structure in paths parallel to the drum axis, said blades being generally radial of the drum and having outer cutting edges, means for engaging said cutting blades with the tread of a tire, cam means on said collar member in driving engagement with said cutting blades for imparting the reciprocating movement to said cutting blades in engagement with said tread and relative to said tread and to said drum structure upon rotation of said collar member around said shaft, and means for rotating said drum structure to advance the cutting blades longitudinally of the tread and for simultaneously rotating said collar member around said shaft to reciprocate the cutting blades to cut incisions in said tread.

2. A tire tread slitting apparatus comprising a rotatable drum, elongated cutter elements mounted on the periphery of said drum in side-by-side relation, said cutter elements being disposed parallel to the drum axis, said cutter elements being substantially radially disposed with cutting edges at their radially outer edges, means for supporting a tire with the tire tread engaging said cutter elements and with the tire free to rotate about an axis substantially parallel to the drum axis, means for causing relative reciprocation of said cutter elements and said tire supporting means in a path parallel to the axis of said drum, and means for rotating said drum and a tire on said support means simultaneously with causing reciprocation of said cutter elements to bring the cutter elements during said relative reciprocation into successive cutting engagement with the tire tread circumferentially about the tread.

3. A tire tread slitting apparatus comprising a rotatable drum, cutter elements slidably mounted on the periphery of said drum in side-by-side relation, said cutter elements being mounted for motion substantially parallel to the drum axis, said cutter elements being substantially radially disposed with cutting edges at their radially outer edges, means for supporting a tire with the tire tread engaging said cutter elements and with the tire free to rotate about an axis substantially parallel to the drum axis, means for reciprocating said cutter elements on said drum substantially parallel to the drum axis, and means for rotating said drum and a tire on said tire supporting means simultaneously with causing reciprocation of said cutter elements to bring the cutting elements while reciprocating into successive cutting engagement with the tire tread circumferentially about the tread.

4. A tire tread slitting apparatus comprising a tire supporting stand having a rotatable tire supporting wheel, a beam pivotally mounted with respect to said stand for swinging movement toward and away from said tire supporting wheel, a rotatable drum on said beam, cutter elements slidably mounted on the periphery of said drum in side-by-side relation, said cutter elements being mounted for motion parallel to the drum axis, said cutter elements being substantially radially disposed with cutting edges at their radially outer edges, means for reciprocating said cutter elements on said drum parallel to the drum axis, and means for rotating said drum simultaneously with causing reciprocation of said cutter elements to bring the cutter elements while reciprocating into successive cutting engagement with the tread of a tire resting on said wheel and engaging said cutter elements.

5. A tire tread slitting apparatus comprising a rotatable drum, cutter elements slidably mounted on the periphery of said drum in side-by-side relation, said cutter elements being mounted for motion parallel to the drum axis, said cutter elements being substantially radially disposed with cutting edges at their radially outer edges, means for supporting a tire with the tire tread engaging said cutter elements and with the tire free to rotate about an axis substantially parallel to the drum axis, means for reciprocating alternate cutter elements on said drum in opposite directions parallel to the drum axis, and means for rotating said drum and a tire on said support means simultaneously with causing reciprocation of said cutter elements to bring the cutting elements while reciprocating into successive cutting engagement with the tire tread circumferentially about the tread.

6. A tire tread slitting apparatus comprising a rotatable drum, slots at the periphery of said drum generally parallel to the drum axis, holders slidable in said slots, a plurality of closely spaced blades mounted in each holder, said blades extending parallel to said slots, said blades being substantially radially disposed with cutting edges at their radially outer edges, means for supporting a tire with the tire tread engaging said cutter elements and with the tire free to rotate about an axis substantially parallel to the drum axis, means for reciprocating said holders and cutter elements on said drum parallel to the drum axis, and means for rotating said drum and a tire on said tire supporting means simultaneously with causing reciprocation of said cutter elements to bring the blades while reciprocating into successive cutting engagement with the tire tread circumferentially about the tread.

7. A tire slitting apparatus comprising a frame, a drum rotatably mounted in said frame, a plurality of blades slidably mounted on the periphery of said drum for motion parallel to the drum axis, said blades being radially disposed and having radially outer cutting edges, a collar rotatably mounted on said apparatus concentric with said drum and rotatable independently of the drum, barrel cam means on said collar, cam follower means on said blades engaging said cam means, relative rotation of said collar and drum reciprocating said blades on the drum parallel to the drum axis, means for rotating said drum at one speed, and means for simultaneously rotating said collar at a higher speed to cause rapid reciprocation of said blades on the drum.

8. A tire slitting apparatus comprising a frame, a drum rotatably mounted in said frame, a plurality of blades slidably mounted on the periphery of said drum for motion parallel to the drum axis, said blades being radially disposed and having radially outer cutting edges, a pair of collars rotatably mounted on said apparatus concentric with said drum and rotatable independently of the drum, oppositely inclined barrel cam means on said collars, cam follower means on said blades, the cam follower means on substantially half of the blades engaging one of said cams and those on the other half engaging the other of said collars, relative rotation of said collars in one direction and said drum in the opposite direction causing reciprocation of all of said blades relative to said drum parallel to the drum axis and reciprocation of said one half of the blades relative to the other half, means for rotating said drum at one speed, and means for simultaneously rotating said collar at a higher speed to cause rapid reciprocation of said blades on the drum.

References Cited in the file of this patent

UNITED STATES PATENTS

| | | |
|---|---|---|
| 1,433,971 | Roberts | Oct. 31, 1922 |
| 1,452,099 | Sipe | Apr. 17, 1923 |
| 1,472,094 | Simon | Oct. 30, 1923 |
| 2,028,053 | Errig et al. | Jan. 14, 1936 |
| 2,034,662 | McLaughlin et al. | Mar. 17, 1936 |
| 2,105,316 | Fleming | Jan. 11, 1938 |
| 2,116,512 | Ericson et al. | May 10, 1938 |
| 2,159,786 | Errig et al. | May 23, 1939 |
| 2,180,556 | Sipe | Nov. 21, 1939 |
| 2,366,685 | Chambers | Jan. 2, 1945 |

FOREIGN PATENTS

| | | |
|---|---|---|
| 427,143 | Great Britain | Apr. 16, 1935 |